United States Patent
DiCintio et al.

(10) Patent No.: US 9,551,490 B2
(45) Date of Patent: Jan. 24, 2017

(54) SYSTEM FOR COOLING A FUEL INJECTOR EXTENDING INTO A COMBUSTION GAS FLOW FIELD AND METHOD FOR MANUFACTURE

(71) Applicant: General Electric Company, Schenectady, NY (US)

(72) Inventors: Richard Martin DiCintio, Simpsonville, SC (US); Patrick Benedict Melton, Horse Shoe, NC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 289 days.

(21) Appl. No.: 14/247,509

(22) Filed: Apr. 8, 2014

(65) Prior Publication Data

US 2015/0285501 A1    Oct. 8, 2015

(51) Int. Cl.
| | |
|---|---|
| *F23R 3/28* | (2006.01) |
| *F23R 3/34* | (2006.01) |
| *B33Y 10/00* | (2015.01) |
| *B33Y 80/00* | (2015.01) |
| *B22F 3/105* | (2006.01) |
| *B22F 5/10* | (2006.01) |
| *F23R 3/14* | (2006.01) |
| *C22C 1/04* | (2006.01) |
| *B22F 1/00* | (2006.01) |

(52) U.S. Cl.
CPC ............. *F23R 3/283* (2013.01); *B22F 3/1055* (2013.01); *B22F 5/10* (2013.01); *B22F 5/106* (2013.01); *B33Y 10/00* (2014.12); *B33Y 80/00* (2014.12); *C22C 1/0433* (2013.01); *F23R 3/14* (2013.01); *F23R 3/34* (2013.01); *F23R 3/346* (2013.01); *B22F 1/0011* (2013.01); *Y02P 10/295* (2015.11)

(58) Field of Classification Search
CPC ............. F23R 3/283; F23R 3/34; F23R 3/346; F23R 3/14
USPC .................................. 60/740, 733, 737, 748
See application file for complete search history.

(56) References Cited

U.S. PATENT DOCUMENTS

| | | | |
|---|---|---|---|
| 5,749,219 A | * | 5/1998 | DuBell .................... F02C 7/26 60/733 |
| 6,047,550 A | | 4/2000 | Beebe |
| 6,735,949 B1 | | 5/2004 | Haynes et al. |
| 7,665,309 B2 | | 2/2010 | Parker et al. |

(Continued)

FOREIGN PATENT DOCUMENTS

WO    WO 2009/126534 A1    10/2009

*Primary Examiner* — Steven Sutherland
(74) *Attorney, Agent, or Firm* — Dority & Manning, PA

(57) ABSTRACT

A system for cooling a fuel injector extending into a combustion gas flow field includes a liner that defines a combustion gas flow path within a combustor and a fuel injector that extends through the liner. The fuel injector includes a main body having an annular first portion that extends outward from the liner and a second portion that extends from the first portion inward into the combustion gas flow path. The main body defines a cooling channel that is fully circumscribed within the main body and that extends between the first portion and the second portion. A cooling air inlet is defined within the annular first portion and is in fluid communication with the cooling channel. A cooling air outlet is in fluid communication with the cooling channel and is defined within the second portion downstream from the cooling air inlet.

20 Claims, 6 Drawing Sheets

(56) References Cited

U.S. PATENT DOCUMENTS

| | | |
|---|---|---|
| 8,061,142 B2 | 11/2011 | Kastrup et al. |
| 8,171,734 B2 | 5/2012 | McMasters et al. |
| 8,281,594 B2 * | 10/2012 | Wiebe ............... F23D 11/36 60/733 |
| 8,312,722 B2 | 11/2012 | York et al. |
| 8,689,559 B2 * | 4/2014 | Kraemer ............. F02C 7/228 60/733 |
| 8,769,955 B2 * | 7/2014 | Van Nieuwenhuizen ...... F23R 3/286 60/737 |
| 2011/0029114 A1 | 2/2011 | Rose et al. |
| 2011/0079013 A1 * | 4/2011 | Mehring ............. F02C 3/145 60/740 |
| 2013/0318975 A1 | 12/2013 | Stoia et al. |
| 2013/0323473 A1 | 12/2013 | Dietsch et al. |

* cited by examiner

SYSTEM FOR COOLING A FUEL INJECTOR EXTENDING INTO A COMBUSTION GAS FLOW FIELD AND METHOD FOR MANUFACTURE

FIELD OF THE INVENTION

The present invention generally involves a fuel injection system for a combustor. In particular, the invention relates to a system for cooling a fuel injector that extends into a combustion gas flow field and a method for fabricating the fuel injector.

BACKGROUND OF THE INVENTION

A gas turbine generally includes a compressor section, a combustion section having a combustor and a turbine section. The compressor section progressively increases the pressure of the working fluid to supply a compressed working fluid to the combustion section. The compressed working fluid is routed through and/or around a fuel nozzle that extends axially within the combustor. A fuel is injected into the flow of the compressed working fluid to form a combustible mixture.

The combustible mixture is burned within a combustion chamber to generate combustion gases having a high temperature, pressure and velocity. The combustion gases flow through one or more liners or ducts that define a hot gas path into the turbine section. The combustion gases expand as they flow through the turbine section to produce work. For example, expansion of the combustion gases in the turbine section may rotate a shaft connected to a generator to produce electricity.

The temperature of the combustion gases directly influences the thermodynamic efficiency, design margins, and resulting emissions of the combustor. For example, higher combustion gas temperatures generally improve the thermodynamic efficiency of the combustor. However, higher combustion gas temperatures may increase the disassociation rate of diatomic nitrogen, thereby increasing the production of undesirable emissions such as oxides of nitrogen ($NO_x$) for a particular residence time in the combustor. Conversely, a lower combustion gas temperature associated with reduced fuel flow and/or part load operation (turndown) generally reduces the chemical reaction rates of the combustion gases, thereby increasing the production of carbon monoxide (CO) and unburned hydrocarbons (UHCs) for the same residence time in the combustor.

In order to balance overall emissions performance and thermal efficiency of the combustor, certain combustor designs include multiple fuel injectors that are arranged around the liner and positioned generally downstream from the primary combustion zone. The fuel injectors generally extend radially through the liner to provide for fluid communication into the combustion gas flow field. This type of system is commonly known in the art and/or the gas turbine industry as Late Lean Injection (LLI) and/or as axial fuel staging.

In operation, a portion of the compressed working fluid is routed through and/or around each of the fuel injectors and into the combustion gas flow field. A liquid or gaseous fuel from the fuel injectors is injected into the flow of the compressed working fluid to provide a lean or air-rich combustible mixture which spontaneously combusts as it mixes with the hot combustion gases, thereby increasing the firing temperature of the combustor without producing a corresponding increase in the residence time of the combustion gases inside the combustion chamber. As a result, the overall thermodynamic efficiency of the combustor may be increased without sacrificing overall emissions performance.

In order to overcome the high momentum of the combustion gases within the combustion gas flow field, a high volume of compressed air must be directed through the fuel injector to adequately push the fuel into the combustion gas flow stream. In addition or in the alternative, the fuel must be supplied at a relatively high pressure to adequately push the fuel into the combustion gas flow field.

Current solutions to address these issues include extending at least a portion of the fuel injector radially inward through the liner and into the combustion gas flow field. However, this approach exposes the fuel injectors to the hot combustion gases which may impact the mechanical life of the component and lead to fuel coke buildup. Therefore, an improved system for cooling a fuel injector that extends into a combustion gas flow field would be useful.

BRIEF DESCRIPTION OF THE INVENTION

Aspects and advantages of the invention are set forth below in the following description, or may be obvious from the description, or may be learned through practice of the invention.

One embodiment of the present invention is a system for cooling a fuel injector that extends into a combustion gas flow field. The system includes a liner that at least partially defines a combustion gas flow path within a combustor. A fuel injector opening extends through the liner. The system further includes a fuel injector having a main body. The main body extends through the opening. The main body includes an annular first portion that is partially disposed within the opening and that extends outward from the liner. The main body also includes a second portion that extends inward from the first portion and into the combustion gas flow path. The main body further defines a cooling channel that is fully circumscribed within the main body and that extends at least partially between the first portion and the second portion. A cooling air inlet is defined within the annular first portion and is in fluid communication with the cooling channel. A cooling air outlet is in fluid communication with the cooling channel downstream from the cooling air inlet.

Another embodiment of the present invention is a system for cooling a fuel injector that extends into a combustion gas flow field. The system includes a liner that defines a combustion gas flow path within a combustor. A fuel injector opening that extends through the liner and a fuel injector. The fuel injector includes a main body that extends through the fuel injector opening. The main body includes an annular first portion that is partially disposed within the opening and that extends outward from the liner. The main body also includes a second portion that extends inward from the first portion into the combustion gas flow path. The first portion and the second portion define a combustion air flow passage through the liner. The fuel injector further comprises a plurality of swirler vanes that are disposed within the combustion air flow passage. The main body further defines a cooling channel that is fully circumscribed within the main body and that extends between the annular first portion and the second portion. A cooling air inlet is defined within the annular first portion. The cooling air inlet is in fluid communication with the cooling channel. A cooling air outlet is in fluid communication with the cooling channel downstream from the cooling air inlet.

Another embodiment of the present invention includes a combustor. The combustor includes a an end cover connected to an outer casing, a fuel nozzle that extends axially downstream from the end cover, a liner that extends downstream from the fuel nozzle and that at least partially defines a combustion gas flow path through the combustor. A high pressure plenum is at least partially formed by the end cover and/or the outer casing. The high pressure plenum at least partially surrounds the liner. The combustor further includes a system for cooling a fuel injector that at least partially extends into a combustion gas flow field. The system includes a fuel injector that extends through the liner. The fuel injector includes a main body that extends through the liner and that includes an annular first portion that extends radially outwardly from the liner and a second portion that extends radially inwardly from the first portion into the combustion gas flow path. The main body further comprises a cooling channel that is fully circumscribed within the main body. The cooling channel extends at least partially between the annular first portion and the second portion. A cooling air inlet is defined along the annular first portion and provides for fluid communication between the high pressure plenum and the cooling channel. A cooling air outlet is in fluid communication with the cooling channel downstream from the cooling air inlet and is positioned on the second portion.

One embodiment of the present invention includes a method for fabricating a main body of a fuel injector where the main body defines a cooling channel fully circumscribed within the main body and a portion of the main body is configured to extend through a combustion liner and extend into a combustion gas flow field. The method includes the steps of determining three-dimensional information of the main body including the cooling channel, converting the three-dimensional information into a plurality of slices that define a cross-sectional layer of the main body, and successively forming each layer of the main body by fusing a metallic powder using laser energy.

Another embodiment of the present invention includes a system for cooling a fuel injector that at least partially extends into a combustion gas flow field. The system includes a liner that defines a combustion gas flow path through the combustor, a fuel injector opening that extends through the liner and a fuel injector. The fuel injector comprises a main body that extends through the fuel injector opening. The main body includes an annular first portion that is partially disposed within the opening and that extends outward from the liner, a second portion that extends from the first portion inwardly into the combustion gas flow path. The main body further defines at least one cooling channel that is fully circumscribed within the main body and that extends between the first portion and the second portion, a cooling air inlet that is defined within the annular first portion and that is in fluid communication with the cooling channel, and a cooling air outlet that is in fluid communication with the cooling channel downstream from the cooling air inlet. The main body is formed by an additive manufacturing process. The additive manufacturing process comprises determining three-dimensional information of the main body including the cooling channel, converting the three-dimensional information into a plurality of slices that define a cross-sectional layer of the main body, where a void is defined within at least some of the layers defining the cooling channel, and successively forming each layer of the main body by fusing a metallic powder using laser energy.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

DETAILED DESCRIPTION OF THE INVENTION

Figure 1:
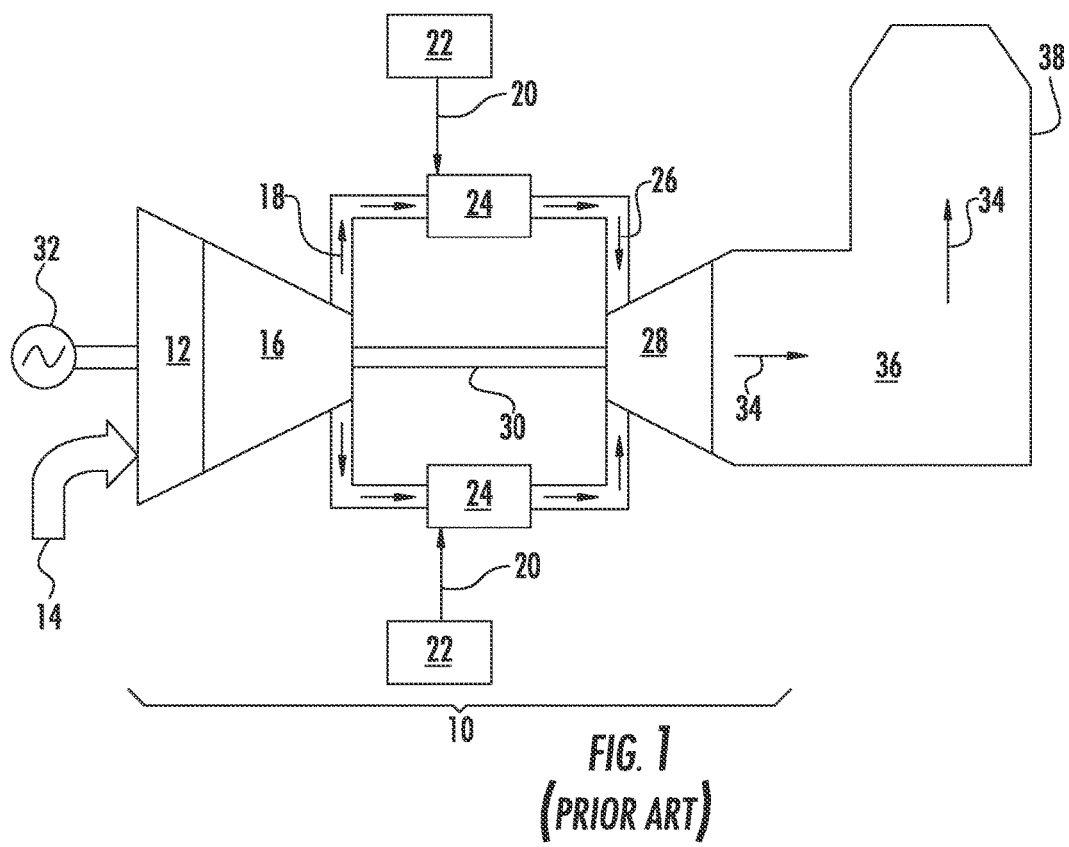
FIG. 1 is a functional block diagram of an exemplary gas turbine within the scope of the present invention.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows. The term "radially" refers to the relative direction that is substantially perpendicular to an axial centerline of a particular component, and the term "axially" refers to the relative direction that is substantially parallel to an axial centerline of a particular component.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents. Although exemplary embodiments of the present invention will be described generally in the context of a system for cooling a fuel injector extending into a combustion gas flow field of a can type combustor incorporated into a gas turbine for purposes of illustration, one of ordinary skill in the art will readily appreciate that embodiments of the present invention may be applied to any combustor incorporated into any turbomachine and is not limited to a can type combustor or a particular gas turbine type unless specifically recited in the claims.

Referring now to the drawings, wherein identical numerals indicate the same elements throughout the figures, FIG. 1 provides a functional block diagram of an exemplary gas turbine 10 that may incorporate various embodiments of the present invention. As shown, the gas turbine 10 generally includes an inlet section 12 that may include a series of filters, cooling coils, moisture separators, and/or other devices to purify and otherwise condition a working fluid (e.g., air) 14 entering the gas turbine 10. The working fluid 14 flows to a compressor section where a compressor 16 progressively imparts kinetic energy to the working fluid 14 to produce a compressed working fluid 18.

The compressed working fluid 18 is mixed with a fuel 20 from a fuel supply system 22 to form a combustible mixture within one or more combustors 24. The combustible mixture is burned to produce combustion gases 26 having a high temperature, pressure and velocity. The combustion gases 26 flow through a turbine 28 of a turbine section to produce work. For example, the turbine 28 may be connected to a shaft 30 so that rotation of the turbine 28 drives the compressor 16 to produce the compressed working fluid 18. Alternately or in addition, the shaft 30 may connect the turbine 28 to a generator 32 for producing electricity. Exhaust gases 34 from the turbine 28 flow through an exhaust section 36 that connects the turbine 28 to an exhaust stack 38 downstream from the turbine 28. The exhaust section 36 may include, for example, a heat recovery steam generator (not shown) for cleaning and extracting additional heat from the exhaust gases 34 prior to release to the environment.

Figure 2:
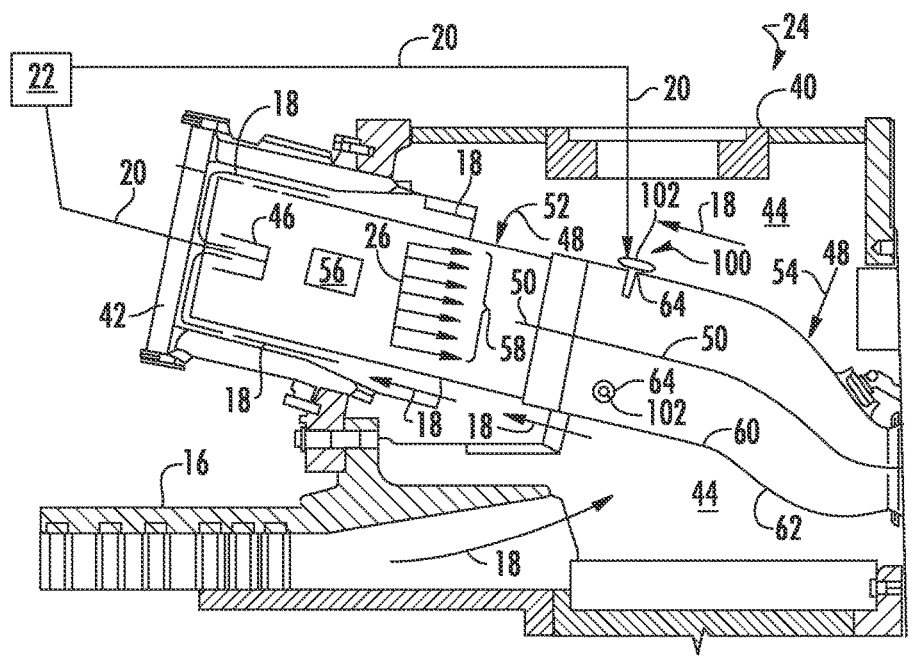
FIG. 2 is a cross-section side view of a portion of an exemplary can type combustor as may incorporate various embodiments of the present invention.

The combustor 24 may be any type of combustor known in the art, and the present invention is not limited to any particular combustor design unless specifically recited in the claims. For example, the combustor 24 may be a can type or a can-annular type of combustor. FIG. 2 provides a cross-section side view of a portion of an exemplary gas turbine 10 including a portion of the compressor 16 and an exemplary can type combustor 24. As shown in FIG. 2, an outer casing 40 surrounds at least a portion of the combustor 24. An end cover 42 is coupled to the outer casing 40 at one end of the combustor 24. The end cover 42 and the outer casing 40 generally define a high pressure plenum 44. The high pressure plenum 44 receives the compressed working fluid 18 from the compressor 16.

At least one fuel nozzle 46 extends axially downstream from the end cover 42 within the outer casing 40. A liner 48 extends downstream from the fuel nozzle 46 within the outer casing 40. The liner 48 is generally annular and extends at least partially through the high pressure plenum 44 so as to at least partially define a combustion gas flow path 50 within the combustor 24 for routing the combustion gases 26 through the high pressure plenum 44 towards the turbine 28 (FIG. 1).

The liner 48 may be a singular liner or may be divided into separate components. For example, the liner 48 may comprise of a combustion liner 52 that is disposed proximate to the fuel nozzle 46 and a transition duct 54 that extends downstream from the combustion liner 52. The liner 48 and/or the transition duct 54 may be shaped so as to accelerate the flow of the combustion gases 26 through the combustion gas flow path 50 upstream from a stage of stationary nozzles (not shown) that are disposed proximate to an inlet of the turbine 28 within the combustion gas flow path 50. A combustion chamber 56 is defined downstream from the fuel nozzle 46. The combustion chamber 56 may be at least partially defined by the liner 48. As shown, the combustion gases 26 define or form a combustion gas flow field 58 within the combustion gas flow path 50 downstream from the combustion chamber 56 during operation of the combustor 24.

The liner 48 generally includes an inner wall 60, an opposing outer wall 62 and an injector opening 64 that extends through the inner wall 60 and the outer wall 62. The injector opening 64 provides for fluid communication through the liner 48. As shown, the liner 48 may include multiple injector openings 64 that are arranged around the liner 48 downstream from the fuel nozzle 46 and/or the combustion chamber 56.

In particular embodiments, as shown in FIG. 2, the combustor 24 includes a system for cooling a fuel injector extending into a combustion gas flow field 58, herein referred to as "system 100". In particular embodiments, the system includes the liner 48 and at least one fuel injector 102 that provides for fluid communication through the liner 48 and into the combustion gas flow field 58. The fuel injector 102 may provide for fluid communication through the liner 48 at any point that is downstream from the fuel nozzle 46 and/or the combustion chamber 56.

Figure 3:
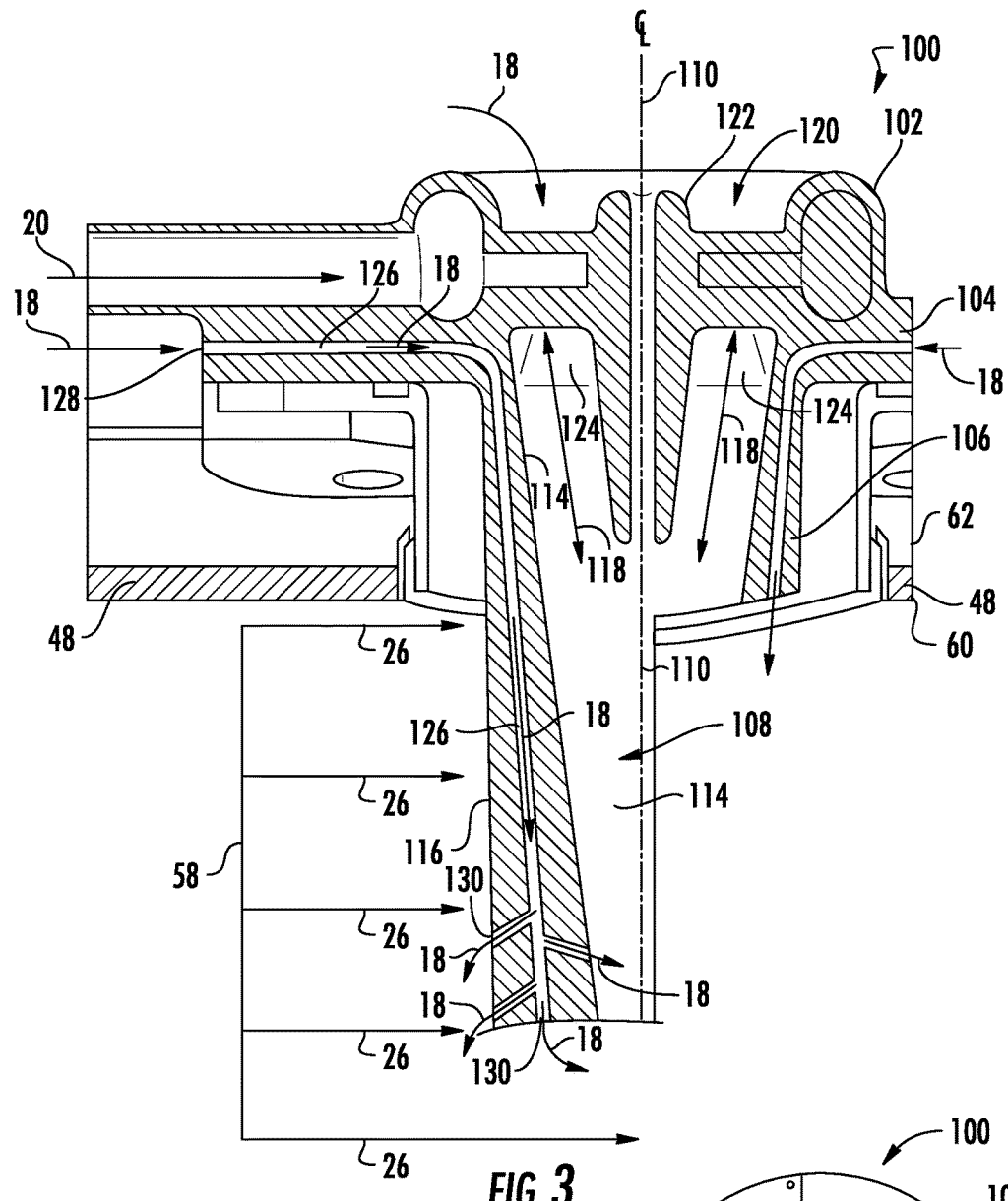
FIG. 3 is a cross sectional side view of a system for cooling a fuel injector extending into a combustion gas flow field, according to various embodiments of the present invention.

FIG. 3 provides a cross sectional side view of the system 100 including a portion of the liner 48 and the fuel injector 102 as shown in FIG. 2, according to one embodiment of the present invention. As shown in FIG. 3, the fuel injector 102 includes a main body 104. The main body 104 may be made as a single piece during manufacturing. Thus, the main body 104 has a monolithic construction, and is different from a component that has been made from a plurality of component pieces that have been joined together via brazing, welding or other joining process to form a single component.

In one embodiment, the main body 104 includes a first portion 106 that is substantially annularly shaped, and a second portion 108 that extends inwardly from the first portion 106 along a centerline 110 of the fuel injector 102. The first portion 106, when installed, is partially disposed within the injector opening 64. The first portion extends along the centerline 110 outwardly from the liner 48, thus substantially positioning the first portion 106 outside of the combustion gas flow field 58. For example, the first portion 106 may terminate at and/or adjacent to the inner wall 60 of the liner 48. The second portion 108 terminates at an end wall 112 defined by the main body 104.

When installed, the second portion 108 extends from the first portion 106 along the centerline 110 inwardly from the inner wall of the liner 48, thus positioning at least a portion the second portion 108, including the end wall 112 within the combustion gas flow path 50 (FIG. 2) and/or into the combustion gas flow field 58. In particular embodiments, as shown in FIG. 3, the second portion 108 is semi-annular. In other embodiments, the second portion 108 may be fully annular.

The main body 104 includes an inner wall or side 114 and an opposing outer wall or side 116. The inner and outer walls 114, 116 extend between the first and second portions 106, 108. The inner wall 114 at least partially defines a combustion air flow passage 118 through the fuel injector 102. An inlet 120 is defined at an upstream end of the main body 104. The inlet 120 provides for fluid communication into the combustion air flow passage 118. In particular embodiments, the second portion 108 is generally oriented so that the outer wall 116 faces towards or into the flow field 58 of the combustion gases 26.

In one embodiment, the inlet 120 is in fluid communication with the high pressure plenum 44 (FIG. 2) and/or another compressed air source for providing the compressed working fluid 18 to the compressed air flow passage 118. In particular configurations, an injector 122 is disposed within the compressed air flow passage 118. The injector 122 is in fluid communication with a fuel source such as the fuel supply 22 (FIG. 2). The fuel source may provide a liquid and/or a gas fuel 20 to the injector 122. The injector 122 is configured to inject a stream, spray or jet of the fuel 20 into the compressed air flow passage 118 during operation of the combustor 24.

Figure 4:
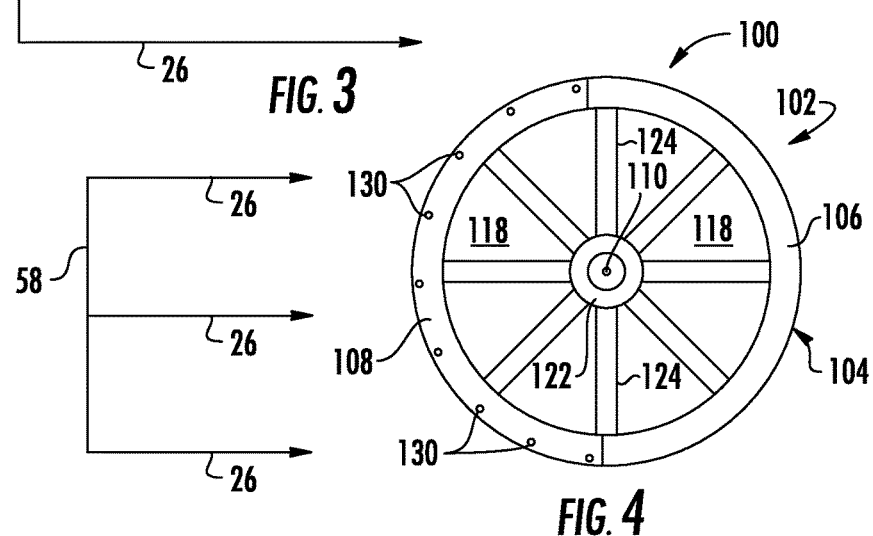
FIG. 4 is a cross sectional bottom view of an exemplary fuel injector according to various embodiments of the present invention.

FIG. 4 provides a cross sectioned bottom view of the fuel injector 102 according to various embodiments of the present invention. In one embodiment, as shown in FIGS. 3 and 4, a plurality of swirler vanes 124 extend within the combustion air flow passage 118. In particular embodiments, the swirler vanes 124 may extend between the injector 122 and the inner wall 114. The swirler vanes 124 may be configured to provide angular swirl to the compressed air 18 or working fluid about the centerline 110 as it flows through the compressed air flow passage 118, thus enhancing mixing with the fuel 20 prior to injection into the combustion gas flow field 58.

In one embodiment, as shown in FIG. 3, the main body 104 defines at least one cooling channel 126. The cooling channel 126 is fully circumscribed within the main body 104. As shown in FIG. 3, the cooling channel 126 extends between the first portion 106 and the second portion 108. In various embodiments, the cooling channel 126 is defined completely between the inner wall 114 and the outer wall 116.

In particular embodiments, the main body 104 including the cooling channel 126 or cooling channels 126 may be formed by additive manufacturing methods or processes, thus providing for greater accuracy and/or more intricate details within the cooling channel 126 than previously producible by conventional manufacturing processes. As used herein, the terms "additively manufactured" or "additive manufacturing techniques or processes" include but are not limited to various known 3D printing manufacturing methods such as Extrusion Deposition, Wire, Granular Materials Binding, Powder Bed and Inkjet Head 3D Printing, Lamination and Photo-polymerization.

In particular embodiments, a cooling air inlet 128 is defined within the first portion 106 of the main body 104. The cooling air inlet 128 is in fluid communication with the cooling channel 126. In particular embodiments, the cooling air inlet 128 provides for fluid communication between a compressed air supply such as the high pressure plenum 44 (FIG. 2) and the cooling channel 126. In various embodiments, the cooling air inlet 128 is positioned outside of the liner 48 and/or outside of the combustion gas flow path 50.

In particular embodiments, the main body 104 defines at least one cooling air outlet 130 that is in fluid communication with the cooling channel 126 downstream from the cooling air inlet 128. In various embodiments, the cooling air outlet 130 is defined within the second portion 108 of the main body 104. In one embodiment, as shown in FIGS. 3 and 4, the cooling air outlet 130 is disposed or defined on the end wall 112, thus providing for fluid communication from the cooling channel through the end wall 112.

In one embodiment, the cooling air outlet 130 is disposed or defined on the outer wall 116 along the second portion 108, thus providing for fluid communication from the cooling channel through the outer wall 116. In one embodiment, the cooling air outlet 130 is disposed or defined on the inner wall 114 along the second portion 108, thus providing for fluid communication from the cooling channel through the inner wall 114. In particular embodiments, the main body defines 104 a plurality of the cooling air outlets 130 where the cooling air outlets provide for fluid communication through at least one of the inner wall 114, the outer wall 116 and/or the end wall 112.

Figure 5:
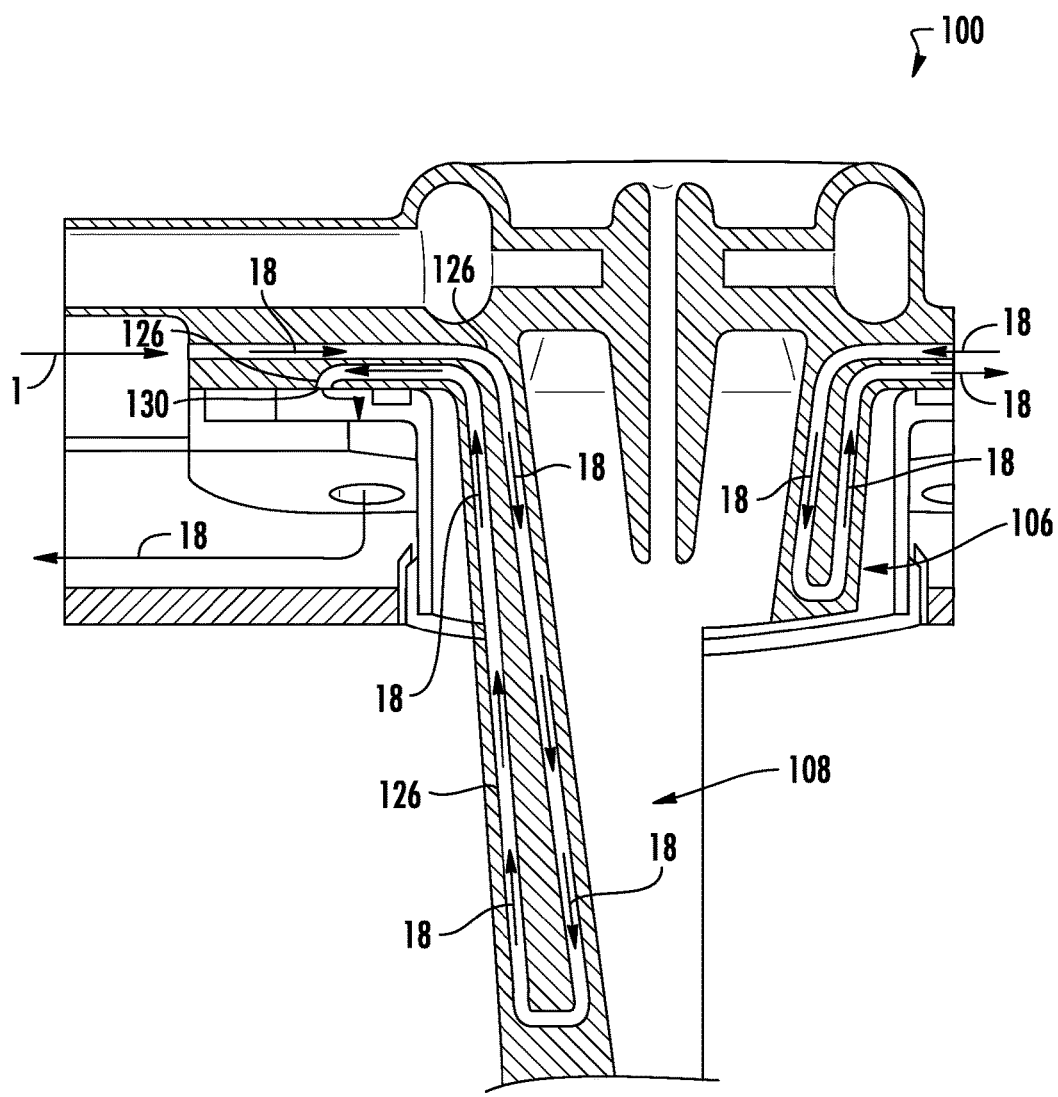
FIG. 5 is a cross sectional side view of a system for cooling a fuel injector extending into a combustion gas flow field, according to various embodiments of the present invention

FIG. 5 provides a cross sectional side view of the system 100 including a portion of the liner 48 and the fuel injector 102 as shown in FIG. 2, according to one embodiment of the present invention. As shown in FIG. 5, at least one cooling channel 126 may extend from the first portion 106 of the main body 104 into the second portion 108 and back into the first portion 106. The cooling air outlet 130 is defined along the first portion 106. As a result, the compressed working fluid 18 may be routed through the main body 102 for cooling and then routed back into the high pressure plenum 44 and/or routed towards a head end of the combustor 24 were it may be used for pre-mixing with fuel 20 from the axially extending fuel nozzle 46 and/or for cooling of other combustor components.

Figure 6:
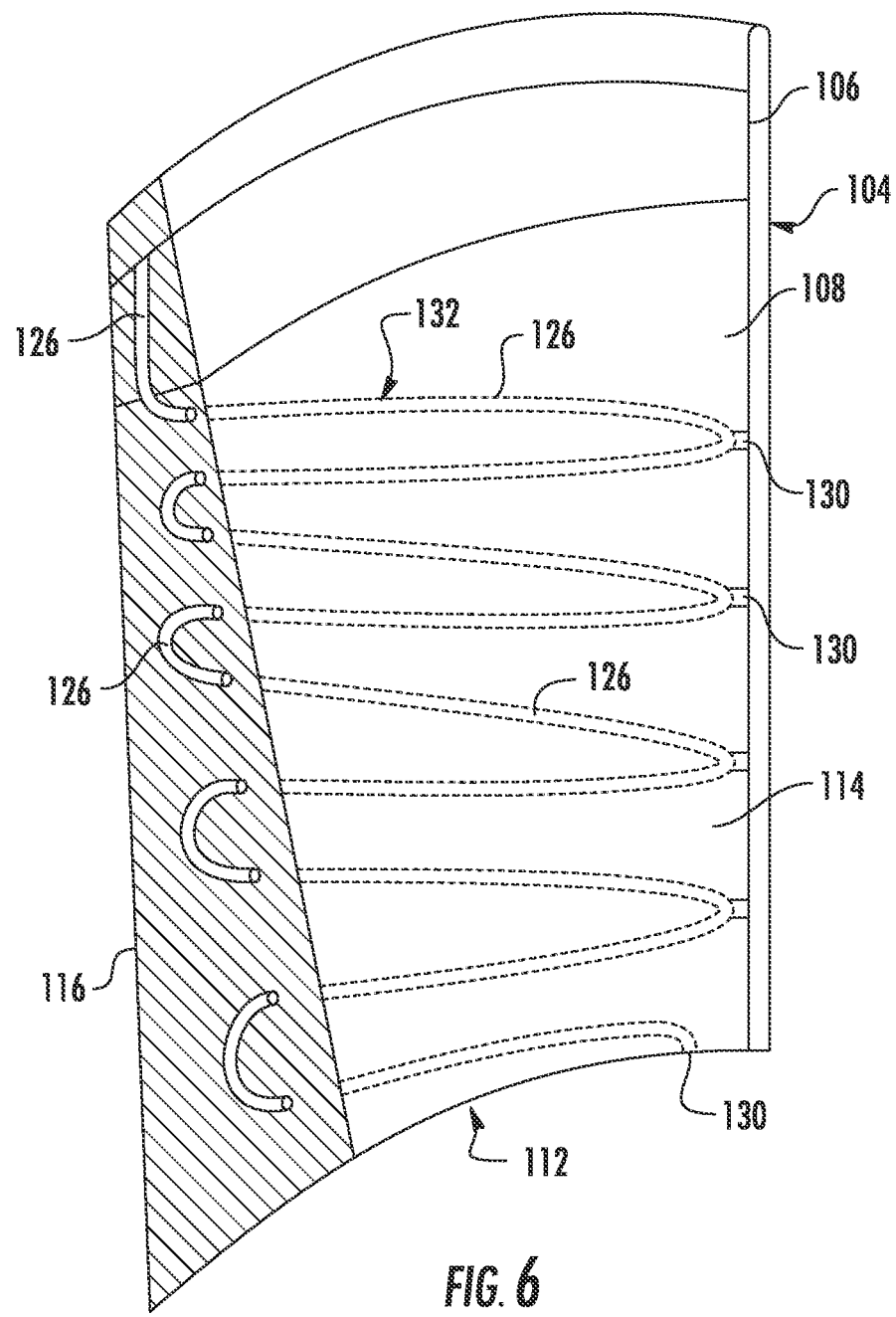
FIG. 6 is a cross sectional perspective view of a portion of the exemplary fuel injector as shown in FIG. 3, according to one embodiment of the present invention.
Figure 7:
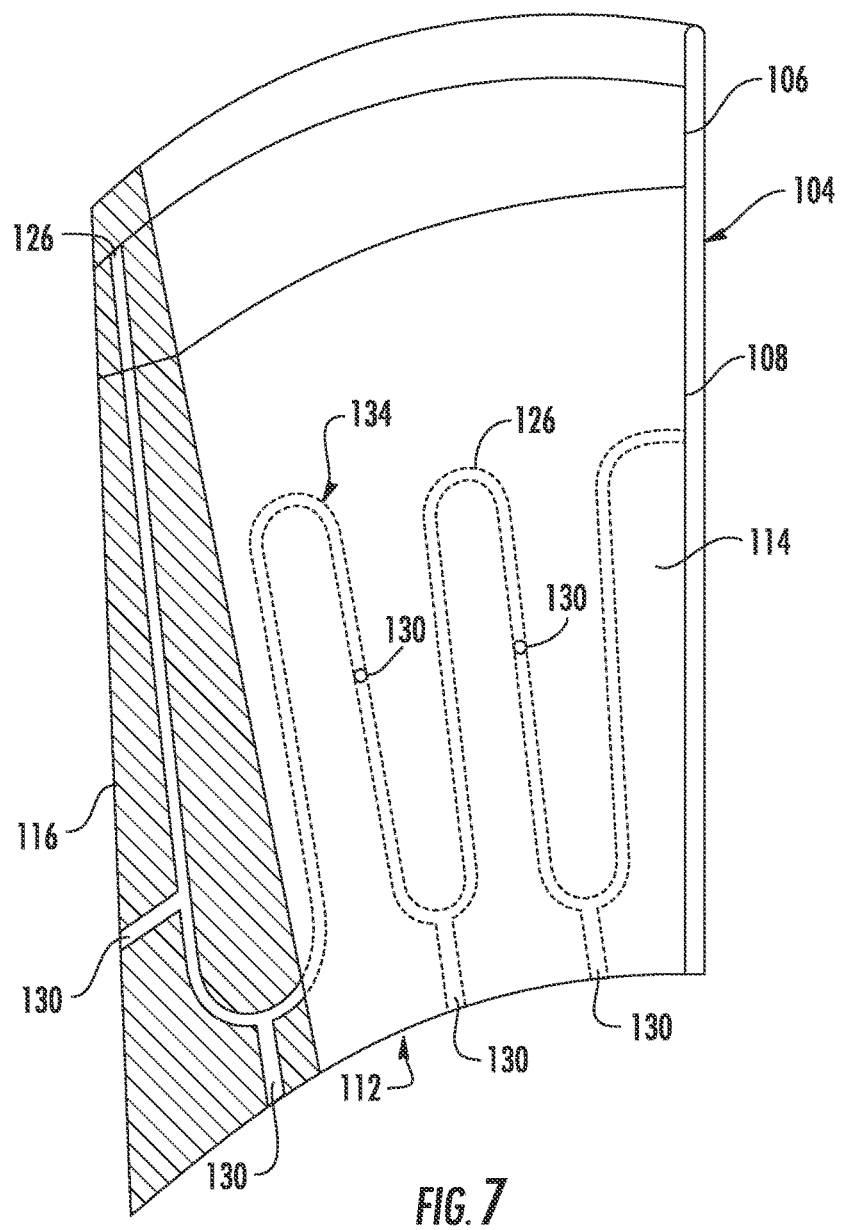
FIG. 7 is a cross sectional perspective view of a portion of the exemplary fuel injector as shown in FIG. 3, according to one embodiment of the present invention.

FIGS. 6 and 7 provide partial cross sectional perspective views of a portion of the main body 104 according to various embodiments of the present invention. In one embodiment, as shown in FIG. 6, the cooling channel 126 extends in a helical pattern 134 within the second portion 108. In this embodiment, the cooling air outlet 130 or outlets 130 may be disposed along at least one of the inner wall 114, the outer wall 116 and the end wall 112. In one embodiment, as shown in FIG. 7, the cooling channel 126 may extend within the second portion 108 in a generally serpentine or winding pattern 134. In this embodiment, the cooling air outlet 130 or outlets 130 may be disposed along at least one of the inner wall 114, the outer wall 116 and the end wall 112.

Figure 8:
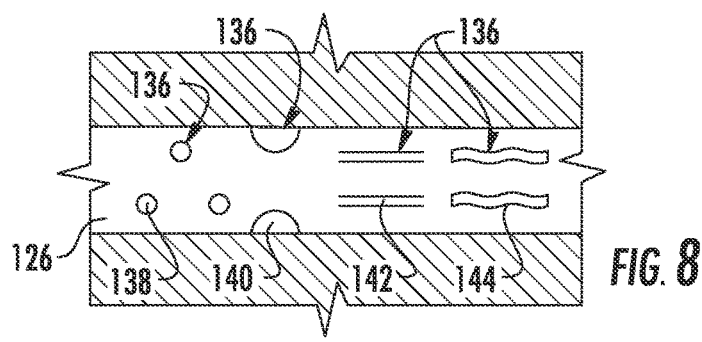
FIG. 8 is a cross sectional view of an exemplary cooling channel including various flow features defined within the cooling channel according to various embodiments of the present invention.

FIG. 8 provides a cross sectional view of an exemplary cooling channel 126 according to one or more embodiments of the present invention. As shown in FIG. 7, one or more flow features 136 may be defined within the cooling channel 126. The flow feature or features 136 may include concave of convex dimples 138, ribs 140, slots 142, grooves 144 or other features for enhancing cooling effectiveness of the compressed air 18 and/or flow of the compressed working fluid 18 through the cooling channel 126 or channels. In various embodiments, the flow feature 136 or features are formed via one or more additive manufacturing methods, techniques or processes previously discussed, thus providing for greater accuracy and/or more intricate details within the cooling channel 126 than previously producible by conventional manufacturing processes.

In operation, as illustrated in FIGS. 2-8, fuel and compressed air 18 are mixed in the compressed air flow passage 118 to form a combustible mixture. The combustible mixture is allowed to penetrate deep into the combustion gas flow field 58 due to the positioning of the second portion 108 of the main body 104. However, as the combustion gases 26 flow across the second portion 108, thermal stresses may significantly reduce the mechanical life of the fuel injector 102. In order to reduce the thermal stresses, compressed working fluid 18 such as air is routed into the cooling channel 126 via the cooling air inlet 128. The compressed working fluid 18 flows through the cooling channel 126, thus removing thermal energy from the second portion 108 by providing at least one of convection, impingement and/or conduction cooling to the inner, outer and/or the end walls 114, 116 and 112 respectively, of the second portion 108. In particular embodiments, the compressed working fluid 18 flows across the flow features 136 to enhance the cooling effectiveness of the compressed working fluid 18, thereby further enhancing the mechanical life of the fuel injector 102.

Conventional LLI fuel injectors are generally expensive to fabricate and/or repair because the conventional LLI fuel injector designs include complex assemblies and joining of a large number of components. More specifically, the use of braze joints can increase the time needed to fabricate such components and can also complicate the fabrication process for any of several reasons, including: the need for an adequate region to allow for braze alloy placement; the need for minimizing unwanted braze alloy flow; the need for an acceptable inspection technique to verify braze quality; and, the necessity of having several braze alloys available in order to prevent the re-melting of previous braze joints. Moreover, numerous braze joints may result in several braze runs, which may weaken the parent material of the component. The presence of numerous braze joints can undesirably increase the weight and manufacturing cost of the component.

In order to reduce costs, weight and to provide the cooling channel 126 and/or the flow feature 136 as described, the main body 104 can be made using an additive manufacturing process. In one embodiment, the additive manufacturing process of Direct Metal Laser Sintering DMLS is a preferred method of manufacturing the main body 104 described herein.

Figure 9:
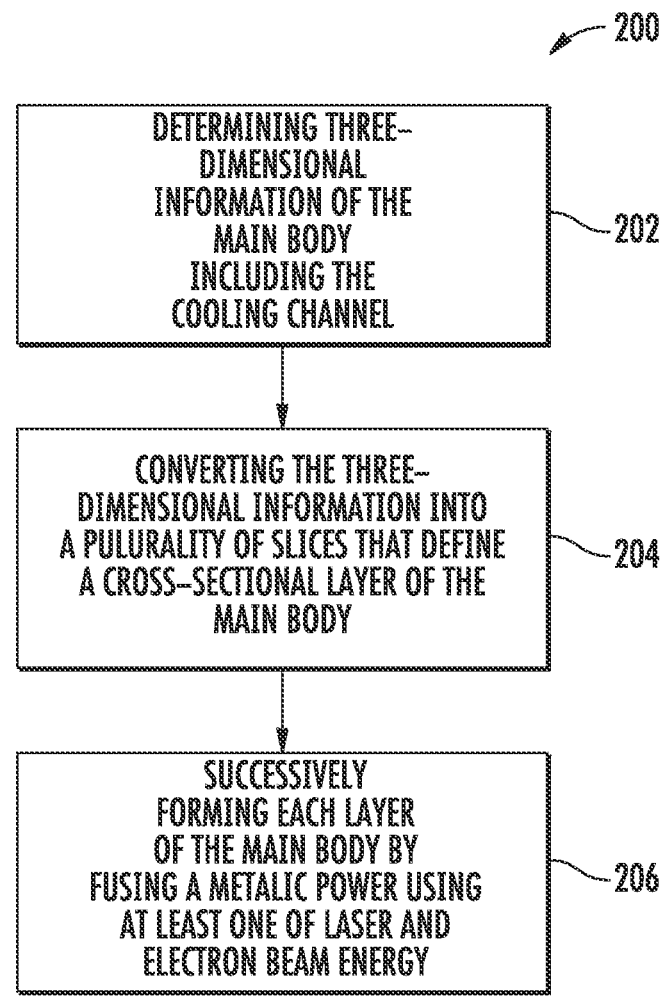
FIG. 9 is a flow chart illustrating an exemplary embodiment of a method for fabricating a main body portion of a fuel injector as shown in various embodiments in FIGS. 2-8.

FIG. 9 is a flow chart illustrating an exemplary embodiment of a method 200 for fabricating the main body 104 as described herein and as shown in FIGS. 2-7. Method 200 includes fabricating at least the main body 104 of the fuel injector 100 using the Direct Metal Laser Sintering (DMLS) process.

DMLS is a known manufacturing process that fabricates metal components using three-dimensional information, for example a three-dimensional computer model of the component. The three-dimensional information is converted into a plurality of slices where each slice defines a cross section of the component for a predetermined height of the slice. The component is then "built-up" slice by slice, or layer by layer, until finished. Each layer of the component is formed by fusing a metallic powder using a laser.

Accordingly, method 200 includes the step 202 of determining three-dimensional information of the main body 104 and the step 204 of converting the three-dimensional information into a plurality of slices where each slice defines a cross-sectional layer of the main body 104. The main body 104 is then fabricated using DMLS, or more specifically each layer is successively formed 206 by fusing a metallic powder using laser energy. Each layer has a size between about 0.0005 inches and about 0.001 inches. As a result, the cooling channel 126 or cooling channels 126 may be defined fully circumscribed within the main body 104. In addition, cooling channel 126 or cooling channels 126 may be formed and/or the flow features 136 may be formed in previously non-producible and/or cost prohibitive patterns and/or shapes.

The main body 104 may be fabricated using any suitable laser sintering machine. Examples of suitable laser sintering machines include, but are not limited to, an EOSINT® M 270 DMLS machine, a PHENIX PM250 machine, and/or an EOSINT® M 250 Xtended DMLS machine, available from EOS of North America, Inc. of Novi, Mich. The metallic powder used to fabricate the main body 104 is preferably a powder including cobalt chromium, but may be any other suitable metallic powder, such as, but not limited to, HS 1888 and INCO625. The metallic powder can have a particle size of between about 10 microns and 74 microns, preferably between about 15 microns and about 30 microns.

Although the methods of manufacturing the main body 104 including the cooling channel 126 or cooling channels 126 and the flow features 136 have been described herein using DMLS as the preferred method, those skilled in the art of manufacturing will recognize that any other suitable rapid manufacturing methods using layer-by-layer construction or additive fabrication can also be used. These alternative rapid manufacturing methods include, but not limited to, Selective Laser Sintering (SLS), 3D printing, such as by inkjets and laserjets, Sterolithography (SLS), Direct Selective Laser Sintering (DSLS), Electron Beam Sintering (EBS), Electron Beam Melting (EBM), Laser Engineered Net Shaping (LENS), Laser Net Shape Manufacturing (LNSM) and Direct Metal Deposition (DMD).

The various embodiments described herein and illustrated in FIGS. 1-8, provide various technical advantages over existing production systems for injecting fuel into a combustion gas flow field. For example, conventional fuel injectors or "late lean" fuel injectors, depend on the proper fuel/air momentum leaving the fuel injector to penetrate into the cross flow or combustion gas flow field for optimal emissions and hardware durability. By utilizing the cooling channels formed using the additive manufacturing processes, the fuel injectors may be inserted deep into the combustion gas flow field, thus allowing for precise placement of fuel air combustible mixture within the combustions gas flow field. As a result, the fuel injectors presented herein are not as sensitive to the engine load as current production fuel injectors. In addition or in the alternative, manufacturing the main body 104 via the additive manufacturing process allows for more intricate and/or complex cooling channel patterns than were producible by existing manufacturing methods. In addition, the additively manufactured main body 104 reduces potential leakage and other potential undesirable effects of having multiple components brazed or otherwise joined together to form the cooling channel(s) 126.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A system for cooling a fuel injector extending into a combustion gas flow field, comprising:
    a liner defining a combustion gas flow path;
    a fuel injector opening extending through the liner;
    a fuel injector having a main body extending through the fuel injector opening, the main body having an annular first portion partially disposed within the fuel injector opening and extending outward from the liner, a second portion that extends from the annular first portion inward into the combustion gas flow path; and wherein the main body further defines:
- a cooling channel fully circumscribed within the main body and extending between the annular first portion and the second portion;
- a cooling air inlet defined within the annular first portion, the cooling air inlet being in fluid communication with the cooling channel; and
- a cooling air outlet in fluid communication with the cooling channel downstream from the cooling air inlet;
- wherein the second portion includes an inner wall, an opposing outer wall and an end wall, wherein the cooling air outlet provides for fluid communication from the cooling channel through at least one of the inner wall, the opposing outer wall and the end wall, and wherein the annular first portion and the second portion define a combustion air flow passage through the fuel injector.

2. The system as in claim 1, wherein the cooling air inlet is positioned outside of the liner.

3. The system as in claim 1, wherein the cooling air outlet is disposed on one of the first portion or the second portion.

4. The system as in claim 1, wherein at least a portion of the cooling channel extends within the main body in at least one of a serpentine pattern and a helical pattern.

5. The system as in claim 1, wherein the second portion of the main body is semi-annular with respect to a centerline extending through a center of the fuel injector.

6. The system as in claim 5, wherein the second portion includes an outer wall oriented towards a direction of the combustion gas flow field, wherein the combustion gas flow field is perpendicular to the outer wall.

7. A system for cooling a fuel injector extending into a combustion gas flow field, comprising:
- a liner defining a combustion gas flow path;
- a fuel injector opening extending through the liner;
- a fuel injector having a main body extending through the fuel injector opening, the main body having an annular first portion partially disposed within the opening and extending outward from the liner, a second portion that extends inward from the annular first portion into the combustion gas flow path, the annular first portion and the second portion defining a combustion air flow passage through the liner, the fuel injector further comprising a plurality of swirler vanes disposed within the combustion air flow passage; and
wherein the main body further defines;
- a cooling channel fully circumscribed within the main body and extending between the annular first portion and the second portion;
- a cooling air inlet defined within the annular first portion, the cooling air inlet being in fluid communication with the cooling channel; and
- a cooling air outlet in fluid communication with the cooling channel downstream from the cooling air inlet;
- wherein the second portion includes an inner wall, an opposing outer wall and an end wall, wherein the cooling air outlet provides for fluid communication from the cooling channel through at least one of the inner wall, the opposing outer wall and the end wall, and wherein at least a portion of the cooling channel extends within the main body in at least one of a serpentine pattern and a helical pattern.

8. The system as in claim 7, wherein the second portion of the main body is semi-annular with respect to a centerline extending through a center of the fuel injector.

9. A combustor for a gas turbine, comprising:
- an end cover connected to an outer casing;
- a fuel nozzle extending axially downstream from the end cover;
- a liner extending downstream from the fuel nozzle, the liner at least partially defining a combustion gas flow path through the combustor; and
- a high pressure plenum surrounding the liner; and
- a system for cooling a fuel injector extending into a combustion gas flow field within the liner, the system having a fuel injector extending through the liner, the fuel injector including a main body that extends through the liner, the main body having an annular first portion that extends radially outwardly from the liner and a second portion that extends radially inwardly from the first portion into the combustion gas flow path, the main body further comprising:
  - a cooling channel fully circumscribed within the main body and extending between the annular first portion and the second portion;
  - a cooling air inlet defined on the annular first portion, the cooling air inlet providing for fluid communication between the high pressure plenum and the cooling channel; and
  - a cooling air outlet in fluid communication with the cooling channel downstream from the cooling air inlet, the cooling air outlet positioned on the second portion;
  - wherein the second portion includes an inner wall, an opposing outer wall and an end wall, wherein the cooling air outlet provides for fluid communication from the cooling channel through at least one of the inner wall, the opposing outer wall and the end wall, and wherein the main body defines a combustion air flow passage, the fuel injector further comprising a plurality of turning vanes disposed within the combustion air flow passage.

10. The combustor as in claim 9, wherein the main body defines one or more heat transfer enhancement features disposed along the cooling channel.

11. The combustor as in claim 9, wherein the cooling air inlet is positioned outside of the liner.

12. The combustor as in claim 9, wherein at least a portion of the cooling channel extends within the main body in at least one of a serpentine pattern and a helical pattern.

13. The combustor as in claim 9, wherein the second portion of the main body is semi-annular with respect to a centerline extending through a center of the fuel injector.

14. The combustor as in claim 9, wherein the second portion includes an outer wall oriented towards a direction of the combustion gas flow field, wherein the combustion gas flow field is perpendicular to the outer wall.

15. A system for cooling a fuel injector extending into a combustion gas flow field, comprising:
- a liner defining a combustion gas flow path;
- a fuel injector opening extending through the liner;
- a fuel injector having a main body extending through the fuel injector opening, the main body having an annular first portion partially disposed within the opening and extending outward from the liner, a second portion that extends from the annular first portion inward into the combustion gas flow path; and wherein the main body further defines:
- a cooling channel fully circumscribed within the main body and extending between the annular first portion and the second portion, wherein at least a portion of the cooling channel extends within the main body in at least one of a serpentine pattern and a helical pattern;
- a cooling air inlet defined within the annular first portion, the cooling air inlet being in fluid communication with the cooling channel; and
- a cooling air outlet in fluid communication with the cooling channel downstream from the cooling air inlet, wherein the second portion includes an inner wall, an opposing outer wall and an end wall, wherein the cooling air outlet provides for fluid communication from the cooling channel through at least one of the inner wall, the opposing outer wall and the end wall;

wherein the main body is formed by an additive manufacturing process, the additive manufacturing process comprising:
determining three-dimensional information of the main body including the cooling channel;
converting the three-dimensional information into a plurality of slices that define a cross-sectional layer of the main body, wherein a void representing a portion of the cooling channel is defined within at least some of the layers defining the cooling channel; and
successively forming each layer of the main body by fusing a metallic powder using laser energy or electron beam energy.

16. The system as in claim 15, wherein the additive manufacturing process is a laser sintering process.

17. The system as in claim 15, wherein the additive manufacturing process is a direct metal laser sintering (DMLS) process.

18. The system as in claim 15, wherein the main body defines a plurality of cooling air inlets and a plurality of cooling air outlets in fluid communication with the cooling channel.

19. The system as in claim 18, wherein the cooling air inlet provides for fluid communication into the cooling channel through an outer wall of the main body.

20. The system as in claim 15, wherein the main body defines one or more flow features disposed along the cooling channel.

* * * * *